United States Patent [19]

Halevy et al.

[11] Patent Number: 4,964,331

[45] Date of Patent: Oct. 23, 1990

[54] AIRBORNE BIRDSTRIKE PREVENTION DEVICE

[76] Inventors: Eyal Halevy, 6521 Tilden La., Rockville, Md. 20852; Michael Amir, 15 Edgewood St., Worcester, Mass. 01602

[21] Appl. No.: 291,737

[22] Filed: Dec. 29, 1988

[51] Int. Cl.$^5$ ............................................. F41A 23/00
[52] U.S. Cl. .................... 89/37.19; 89/1.814; 89/27.3; 116/23
[58] Field of Search .............. 89/1.814, 1.801, 25, 89/27.14, 37.19, 1.56, 1.54; 43/1; 446/398, 399, 400; 42/106; 116/22 A, 23; 102/489; 244/190

[56] References Cited

U.S. PATENT DOCUMENTS

| | | | |
|---|---|---|---|
| 2,649,262 | 8/1953 | Fahrney | 244/190 |
| 3,957,230 | 6/1976 | Boucher et al. | 244/190 |
| 4,172,407 | 10/1979 | Wentink | 102/489 |
| 4,437,428 | 3/1984 | Hoffelner | 116/22 A |
| 4,457,233 | 7/1984 | Hyde | 102/346 |
| 4,475,102 | 10/1984 | Troy et al. | 116/22 A |
| 4,625,646 | 12/1986 | Pinson | 102/489 |
| 4,730,793 | 3/1988 | Thurber, Jr. | 244/3.21 |
| 4,736,907 | 4/1988 | Steffen | 244/1 R |

Primary Examiner—Charles T. Jordan
Assistant Examiner—Michael J. Carone
Attorney, Agent, or Firm—Fleit, Jacobson, Cohn, Price, Holman & Stern

[57] ABSTRACT

A mobile, radio-controlled (RC) airplane flies around an airport in a random pattern, as controlled by an operator with a range greater than needed to scare away birds from runways. The RC airplane includes a receiver to control the launching of a special purpose cracker cartridge having a capsule which burns with a faint smoke trail for a predetermined period of time, after which the projected capsule explodes with a brilliant flash, loud noise, and a small cloud of smoke. By this technique, birds are actually chased out of the path of a runway at an airport. Further, this device can be used to scare birds from agricultural areas, as well as in military training exercises to simulate return fire from attacking aircraft or for use as scare shells during military or paramilitary field training. The cannon firing mechanism which launches the exploding capsule is controlled by a manually operated transmitter from the ground.

10 Claims, 10 Drawing Sheets

AUTOMATIC PILOT & SELECTOR - BLOCK DIAGRAM

FIG. 10

AUTOMATIC PILOT - BLOCK DIAGRAM

FIG.11

AIRBORNE BIRDSTRIKE PREVENTION DEVICE

FIELD OF THE INVENTION

The present invention relates to a birdstrike prevention device which is mounted on a radio-controlled airplane. The birdstrike prevention device is controlled by radio signals.

BACKGROUND OF THE INVENTION

A major problem at today's airports is to prevent birds from congregating adjacent to airports, particularly near runways. The presence of birds at airports oftentimes results in birds colliding with aircraft taking off and landing. This collision presents a serious danger to the safe operation of the aircraft, especially if the bird engages the aircraft engines.

Previous attempts to limit the presence of birds adjacent to runways have included sporadic launching of incendiary devices from stationary locations. The intent of the use of incendiary devices is to produce an explosion to scare birds away from runways and thereby prevent their flying in the flight paths of airplanes and jet aircraft. Further, due to the occasional explosion, it is hoped that the birds would tend to nest elsewhere and thereby provide the area immediately surrounding an airport from supporting a bird population.

These efforts have proven ineffective. The incendiary devices commonly used have limited range of travel, and the stationary location from which incendiary devices are projected provides a defined area from which birds are scared to fly. After a period of time, birds tend to congregate at the peripheral edges of the defined area outside the range of which an explosion would cause a bird to be scared. Birds would, therefore, resume their flight path through the restricted airspace, again, endangering the safety of landing and departing aircraft.

SUMMARY OF THE PRESENT INVENTION

By the present invention, a mobile, radio-controlled (RC) airplane flies around an airport in a random pattern, as controlled by an operator, with a range greater than needed to scare away birds from runways. The RC airplane includes a receiver to control the launching of a special purpose cracker cartridge having a capsule which burns with a faint smoke trail for a predetermined period of time, after which the projected capsule explodes with a brilliant flash, loud noise, and a small cloud of smoke. By this technique, birds are actually chased out of the path of a runway at an airport. Further, this device can be used to protect agriculture from birds or in military training exercises to simulate return fire from attacking aircraft or for use as scare shells during military or paramilitary field training. The cannon firing mechanism which launches the exploding capsule is controlled by a manually operated transmitter from the ground.

In addition, the radio-controlled airplane of this invention includes an automatic pilot system. This system is activated automatically if communication is interrupted between the receiver on the airplane and the remote transmitter or, alternatively, manually activated should a user wish to place the plane in this mode. The automatic pilot system includes mercury switches for detecting the pitch and roll of the airplane and generating appropriate control signals to maintain the flight of the plane. The plane can be programmed to fly in a gradual sweeping turn in the automatic pilot mode so that the plane stays within the range of the remote transmitter. In this way, the risk of damage to or loss of the plane is prevented, since a plane will adapt a safe flight path without control signals from the transmitter.

It is an object of the present invention to provide a remote control cannon mounted on a radio-controlled airplane for launching of incendiary devices.

It is another object of the present invention to provide a remote control cannon mounted on a radio-controlled airplane for firing of incendiary devices by radio signals transmitted by a transmitter located on the ground.

It is a further object of the present invention to provide a remote control cannon mounted on a radio-controlled airplane for firing of incendiary cartridges in a selected sequence at selected times to effectively scare birds away from airports, or provide simulated battlefield noise for combat training.

It is yet another object of this invention to provide an automatic pilot system for controlling the flight of a radio-controlled airplane should communication between the receiver on the airplane and a remote transmitter be interrupted.

It is still a further object of this invention to provide an automatic pilot system for a radio-controlled airplane which is programmable to cause the airplane to maintain a desired flight path while the automatic pilot system is in operation.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings in general, and to FIGS. 1-5 in particular, a cannon firing mechanism embodying the teachings of the subject invention is generally designated as 20. With reference to its orientation in FIG. 1, the cannon firing mechanism 20 is mounted on one side of a fuselage 22 of a radio-controlled airplane 24. The wing 26 is counterbalanced by a weight 28 located at the end of the wing 26 opposite to the side at which the cannon firing mechanism 20 is located. For the cannon firing mechanism shown, a 15 gram weight is sufficient to counter the weight of the cannon firing mechanism. The cannon firing mechanism 20 is mounted on the side of the fuselage 22 by two support brackets 30 and 32 at a slight angle from the fuselage to prevent the projectiles shooting from the assembly, as shown by arrows 34, from hitting the propeller 36.

Figure 1:
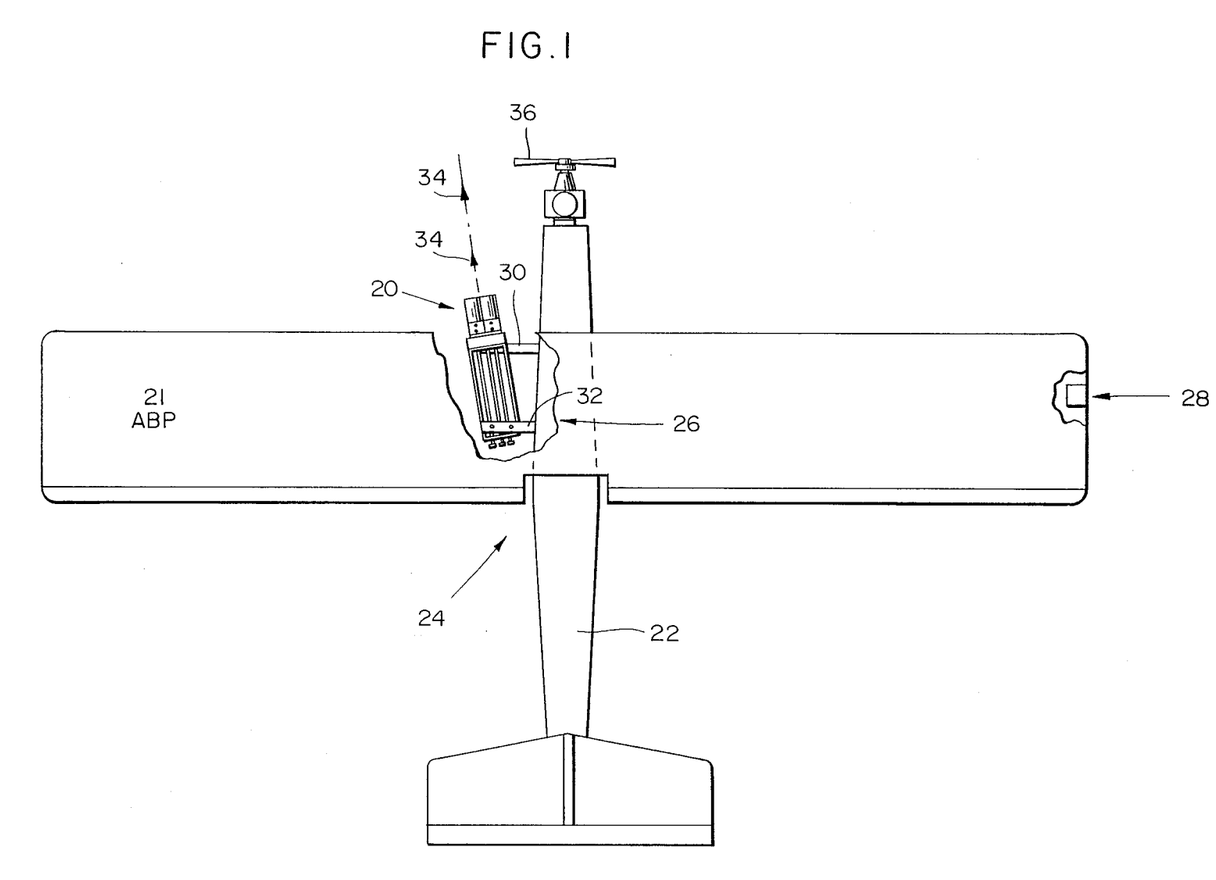
FIG. 1 is a top plan, partially cut-away view of a radio-controlled plane having a side-mounted cannon firing mechanism.
Figure 2:
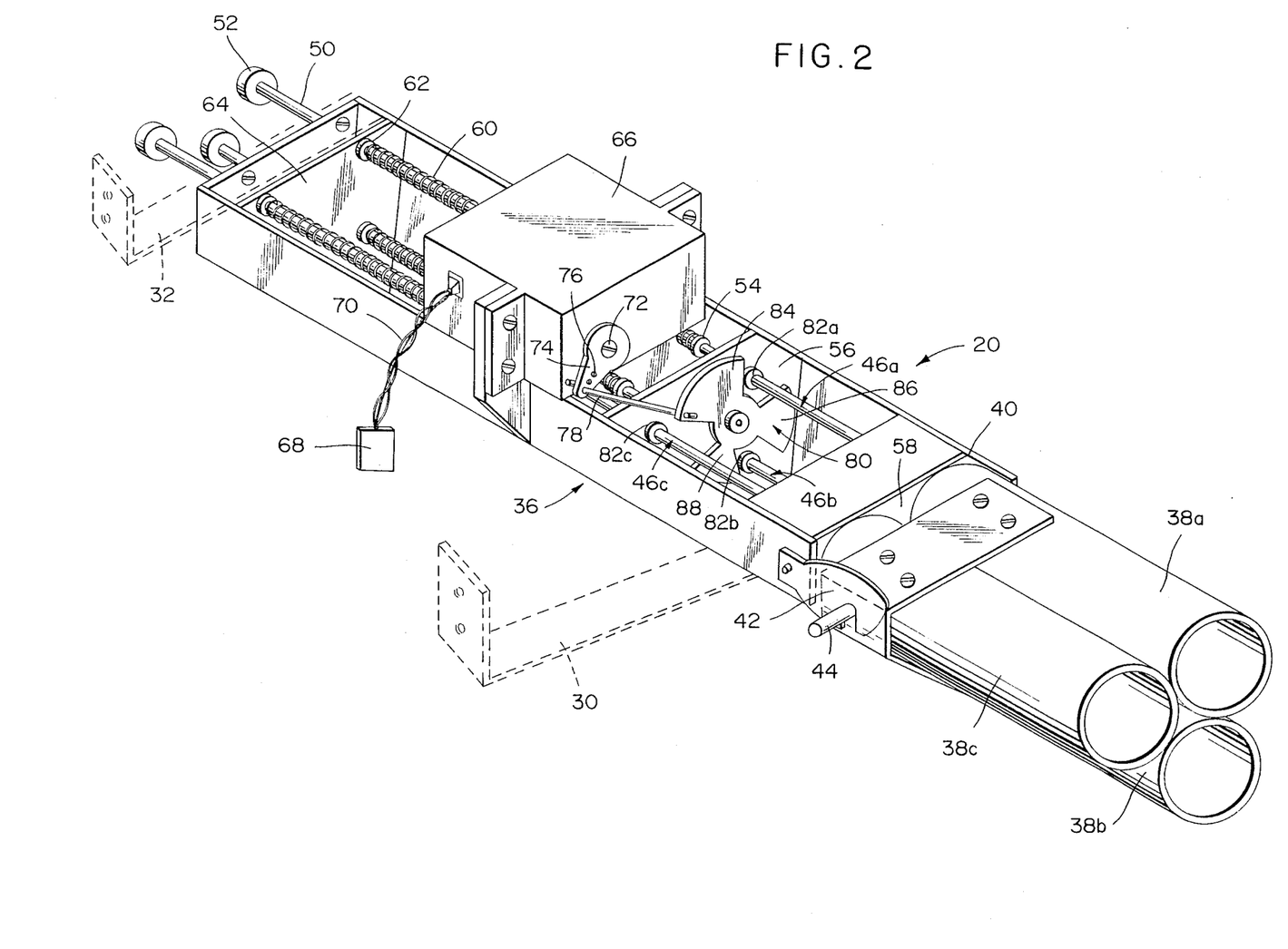
FIG. 2 is a perspective view of the cannon firing mechanism shown in FIG. 1.

In FIG. 2, a more detailed view of the cannon firing mechanism 20 is shown. The body 36 of the mechanism 20 is elongated and generally rectangular. At one end of the body 36 are three firing tubes 38a, 38b, and 38c, which are secured together and pivotably mounted as a group about hinge 40, shown in greater detail in FIGS. 3 and 5, for swinging the tubes 38a-c away from the body 36 upon release of pivotally mounted latch 42 from around lock pin 44. Hinge half 41 is mounted on body 36, and hinge half 39 is mounted on the firing tubes 38.

Extending through the body 36 are three elongated firing pins 46a, 46b, and 46c, shown in the extended position in FIG. 2. One end of the pins 46a-c extends to the end of the tubes 38 located adjacent to wall 58. The opposite end 50 of the firing pins 46a-c projects from the end of the body 36 and includes cocking knob 52. A stop 54 mounted on each of the pins 46a-c proximate to firing wall 56 prevents the forwardmost end 48a-c of the firing pins from extending very far beyond wall 58. Springs 60 surround ends 50 of the firing pins 46a-c and extend between stop 54 and sleeve 62 mounted in wall 64 through which the firing pins slide.

Mounted on top of the body 36 is servo motor housing 66. Inside servo motor housing 66 is a servo motor (depicted in FIG. 6), as is known in the art. An electrical impulse is received through connection 68 via lead wires 70, as in the known in the art, to deliver impulses to the servo motor. Connected to an output shaft 72 of the servo motor is arm 74. Secured within one of the three openings 76 of the arm 74 is rigid link wire 78. The opposite end of link wire 78 is connected within hole 90 of firing cam 80. Cam 80 is rotatably mounted on wall 56 so as to pass in front of slide sleeves 82a, 82b, and 82c, which are fixed in the wall 56 and through which the firing pins 46a-c slide.

Figure 3:
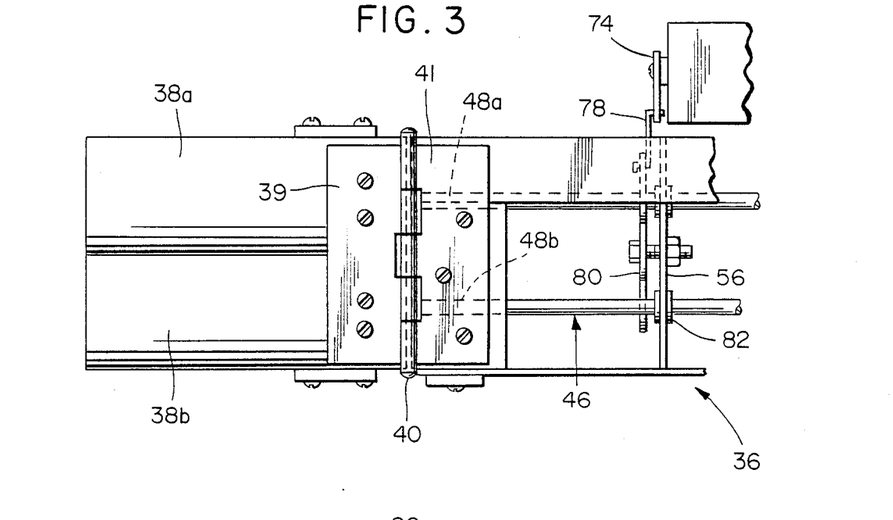
FIG. 3 is a side, partial sectional view of a firing mechanism shown in FIGS. 1 and 2.
Figures 4, 5:
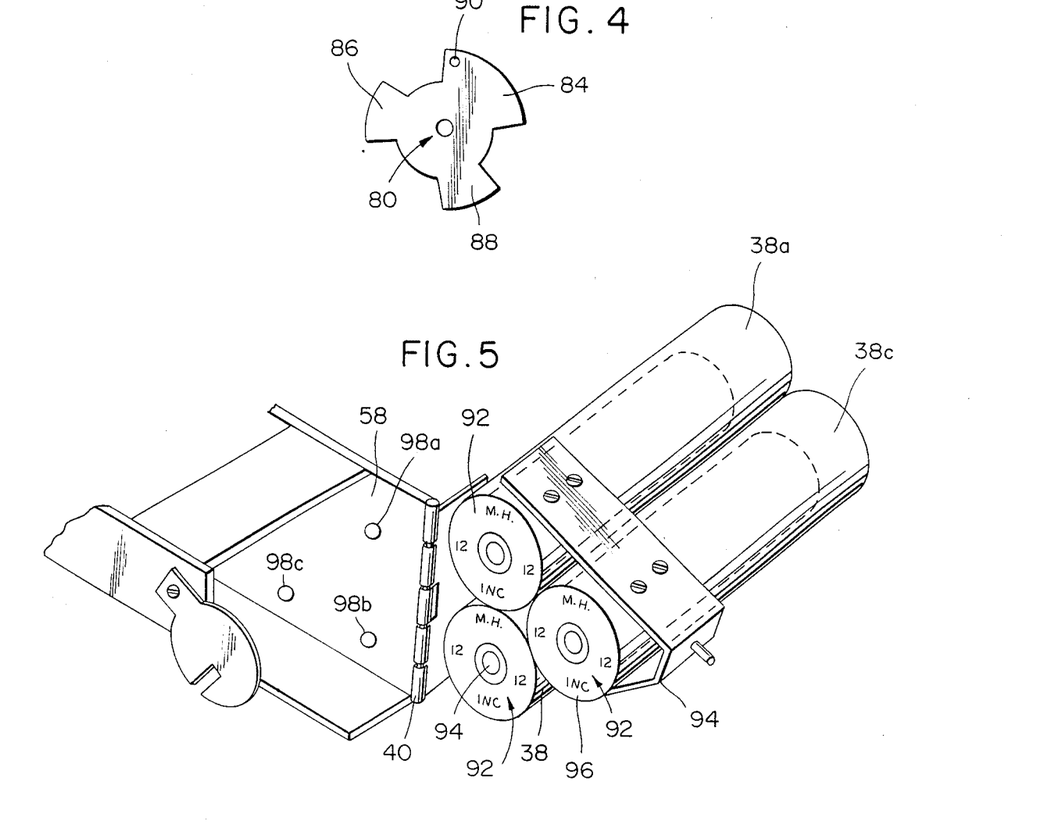
FIG. 4 is a plan view of a firing cam.
FIG. 5 is a perspective view of the cannon firing mechanism in a loading position.

As shown in FIGS. 2-4, the movement of the cam 80 is controlled through link 78 by the movement of arm 74. In FIG. 4, the particular configuration cf cam 80 is shown. Cam 80 includes three sectors 84, 86, and 88. Sector 84 includes hole 90 for receipt of one end of link 78.

By movement of arm 74 to three different positions, as a result of signals transmitted from a ground transmitter and received by the airplane 24 to cause movement of the servo motor, the cam 80 is moved between three different positions plus the rest position shown in FIG. 2. Due to the differing size of the cam sectors 84, 86, and 88, it is possible to first pull back one end 48a of firing pin 46a against the force of spring 60 to within sleeve 82a and then actuating the ground transmitter switch 102 to cause the servo motor to move the arm 74 to move the cam 80 so that sector 84 covers the withdrawn end 48a of firing pin 46a. Firing pin 46b is then withdrawn to a position where end 48b is within sleeve 82b by the pulling of the knob 52 against the force of compression of spring 60. The servo motor is then signaled by switch 104 to advance to a second position such that the cam 80 is moved so that sector 86 covers the withdrawn end 48b of firing pin 46b. At the same time, sector 84 maintains its coverage of sleeve 82a through which firing pin 46a has been withdrawn. Firing pin 46c is then withdrawn by knob 52 against the force of compression of spring 60 and the servo motor signaled by switch 106 to advance the cam 80 so that sector 88 covers the sleeve 82c through which firing pin 46c has been withdrawn. Simultaneously, sector 84 prevents firing pin 46a from moving forward, and sector 86 prevents firing pin 46b from moving forward.

In FIG. 5, tubes 38a-c are shown pivoted away from wall 58 of the body. Placed within each of the tubes 38 is a 12-gauge cartridge 92, such as BIRDFRITE, available from the Australian Office of Defense Production. Other exploding cartridges may be used, even of a lesser caliber, if used in combination with an adapter to fit within tubes 38a-c. Upon striking of firing cap 94, a propelling charge in the cartridge launches a capsule from the cartridge and ignites the capsule which burns with a faint smoke trail for 2.25 seconds and then the launched capsule explodes with a loud noise, brilliant flash and a small cloud of white smoke. Tubes 38a-c are sized so that the rims 96 of the cartridges 92 fits against their ends. When swung to the closed position and latched by latch 42 around pin 44, the detonation caps 94 of the cartridges are aligned with holes 98a, 98b, and 98c of wall 58.

Figure 6:
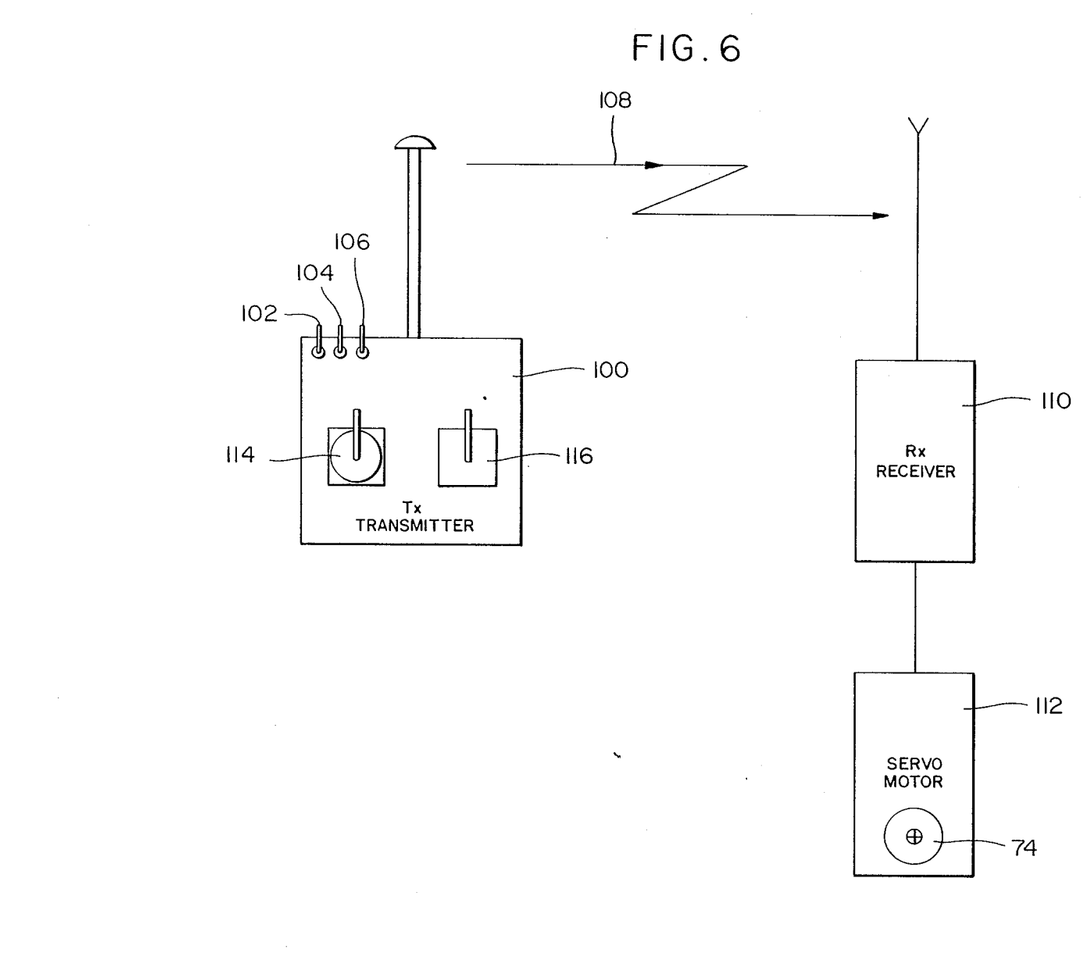
FIG. 6 is a schematic diagram of a radio control system.

In operation, a transmitter 100 is used to control the flight of the airplane 24. A Futaba Digital Proportional Radio Control, Model No. FP-5NLP may be used to control the flight of the airplane. The transmitter 100 is modified to include three switches 102, 104, and 106. Controls 114 and 116 are used for the flying of the airplane, as is known in the art.

Upon movement of the switches 102, 104, 106, a radio signal 108 is transmitted through the air to a receiver 110, which is located in the fuselage of the airplane. Receiver 110 then sends a signal to servo motor 112, which is located in servo motor housing 66 and to which arm 74 is mounted. Upon movement of switch 102, the cam 80 is moved by servo motor 112 to the position covering the sleeve 82a through which firing pin 46a has been withdrawn. By movement of switch 104, the cam 80 is further moved to cover sleeve 82b; and, correspondingly, by actuation of switch 106, the cam 80 is moved to cover sleeve 82c. Conversely, during flight of the airplane 24, when the tubes 38a-c are loaded with exploding cartridges 92, by movement of switch 106 to its original position, cam 80 moves in the reverse direction to uncover sleeve 82c, which releases firing pin 46c to project through hole 98c in wall 58 so as to strike the detonation cap 94 of the cartridge 92 in 38c and thereby launch the capsule with its delay fuse ignited by the propelling charge to burn with a faint smoke trail and then explode with a brilliant flash and a small cloud of white smoke. At the same time, firing pins 46b and 46a are maintained in their primed condition, with the two remaining cartridges remaining unexploded. After further flying about of the airplane, and the desire to release a second cartridge, servo motor 112 is activated by switch 104 to rotate the cam 80 such that firing pin 46b is released, which projects under the force of the spring 60 through hole 98b to contact a detonation cap and subsequent expulsion of the exploding capsule. By movement of switch 102 to its original position, cam 80 moves to release firing pin 46a to contact detonation cap 94 through hole 98a and release of the third exploding capsule. After firing of all three of the exploding cartridges 92, the airplane is returned to the ground for reloading.

Figure 7:
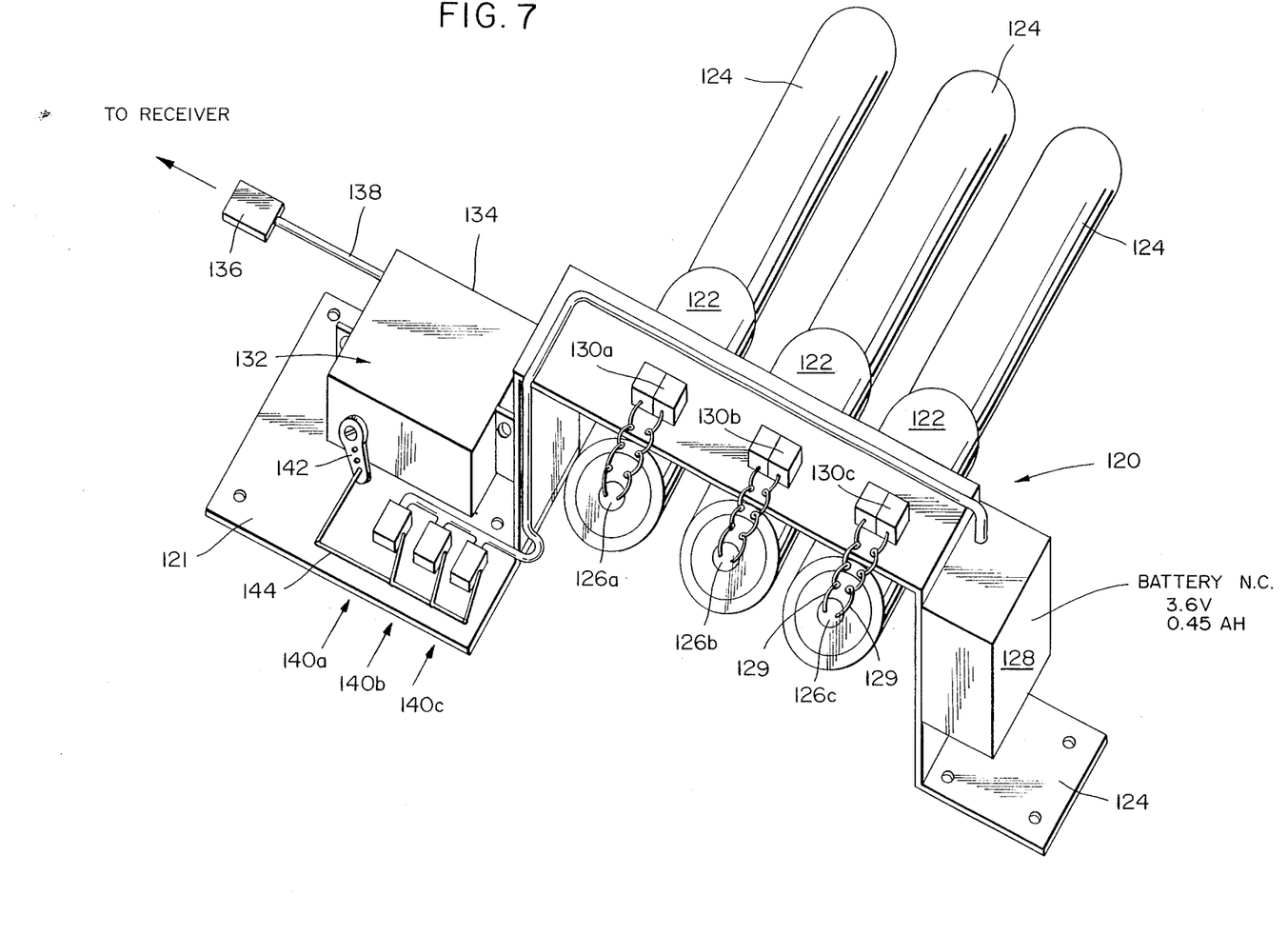
FIG. 7 is a view of an alternate rocket firing mechanism.
Figure 8:
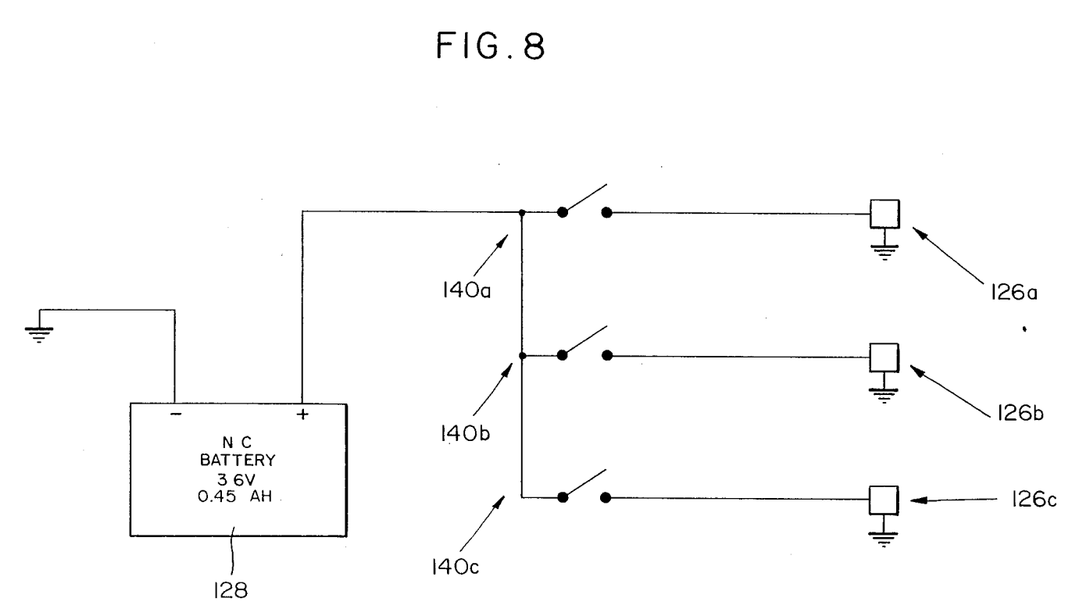
FIG. 8 is a schematic electrical diagram for the rocket firing mechanism of FIG. 7.

In an alternate embodiment, as shown in FIGS. 7 and 8, a rocket launcher 120 is shown for mounting onto the top of the wing of a radio-controlled plane by brackets 121, 123. By this mechanism, three rocket tubes 122 hold firework or rocket projectiles 124. Electrical igniters 126 are electrically connected to battery 128 of the nickel cadmium type, 3.6 volts, 0.45AH through the switches 140a, 140b, 140c. Nichrome wires 129 in each rocket 124 are connected from the electrical igniters 126 via terminals 130a-c and switches 140a-c to the battery 128.

Similar to the cannon firing mechanism, a servo motor 132 within servo motor housing 134 receives signals from the radio-controlled receiver via electrical connection 136 and lead lines 138. Three microswitches 140 are controlled by the movement of arm 142 and the lifting of rigid link 144. The microswitches 140a, 140b, and 140c are set so that upon different elevations of the link 144, successive ones of the microswitches 140a, 140b, and 140c are closed, as in FIG. 8. Closure of the microswitch sends electrical current to the igniters 126a, 126b, and 126c, respectively, from the battery 128 so as to provide an electrical charge to detonating igniters so as to cause their firing, depending upon the position of the link 144, as lifted by the arm 142.

Referring to FIGS. 9-13, the automatic pilot system for the airborne birdstrike prevention device of the present invention is illustrated. In accordance with the preferred embodiment of this invention, should any block in communication occur between the transmitter and receiver, the automatic pilot system will take over the operation of the plane.

Figure 9:
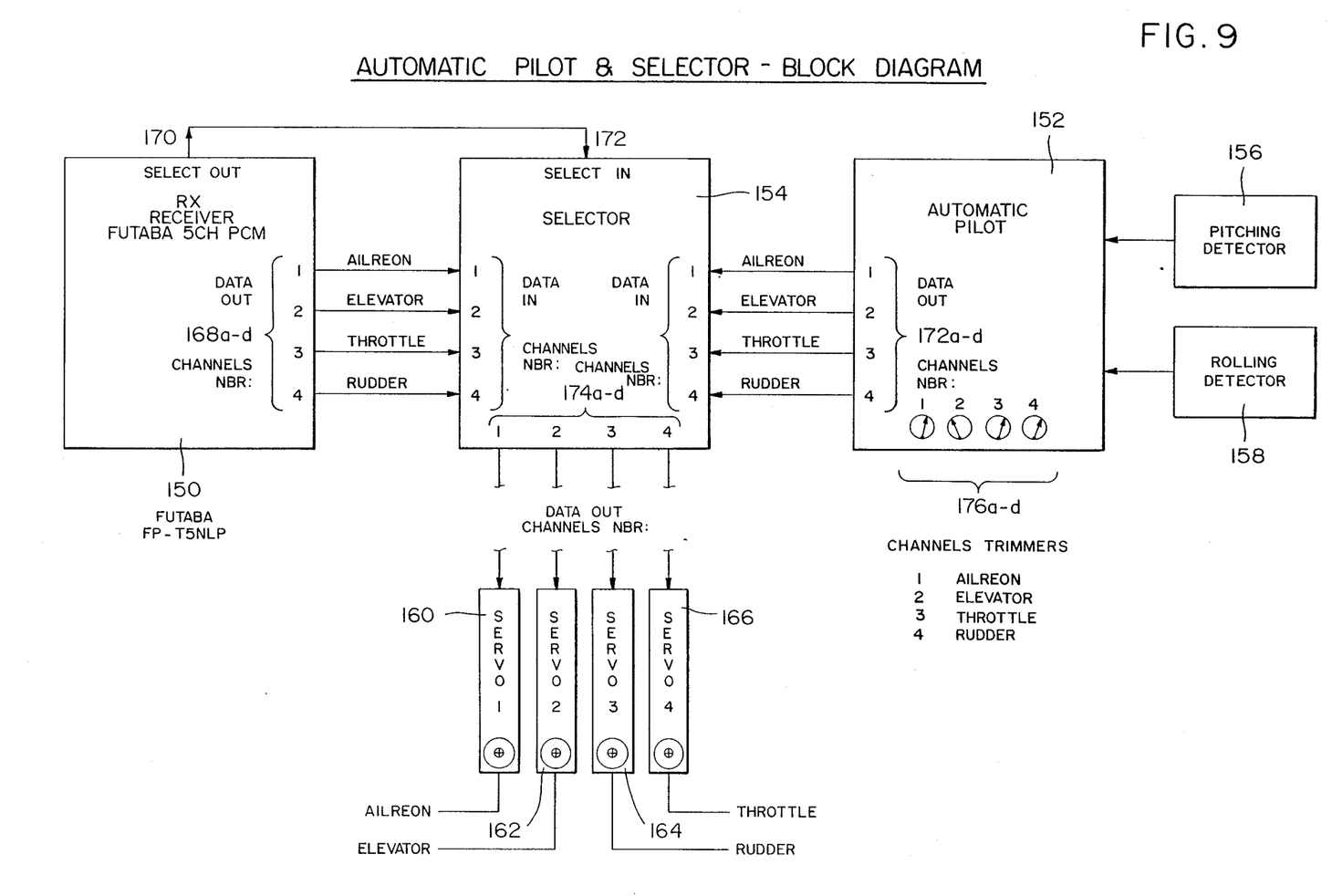
FIG. 9 is a block diagram illustrating the automatic pilot system in accordance with the present invention.

With reference to FIG. 9, a receiver 150 and an automatic pilot unit 152 are connected to a selector unit 154. The automatic pilot unit 152 receives input information from a pitching detector 156 and a rolling detector 158. The output of the selector unit drives the servo devices 160-166. The receiver unit 150, selector unit 154, automatic pilot unit 152, pitching detector 156, rolling detector 158, and servos 160-166 are provided on the airplane. The receiver separates and relays a four-channel pulse code modulated (PCM) signal to the selector unit 152.

The receiver 150 outputs four lines of information to the selector unit 154. Specifically, four data lines 168a-d, corresponding to signals for controlling the aileron, elevator, throttle, and rudder, respectively, are provided. In addition, a select output line 170 is provided. Similarly, the automatic pilot unit 152 has four data output lines 172a-d, corresponding to control signals for the aileron, elevator, throttle, and rudder. The source of the control signals at the data output lines of the receiver 150 is the remote transmitter. On the other hand, the source for generating signals on the data output lines 172a-d of the automatic pilot unit 152 is the combination of the pitching detector 156 and the rolling detector 158 and two predetermined signals for throttle or rudder control.

Should communication between the receiver 150 and the remote transmitter be interrupted or interfered with in any manner, the select output line 170, connected to the select input line 172 of the selector unit 154, will trigger the selector unit to pass the data output signals on lines 172a-d of the automatic pilot unit 152 to the data output lines 174a-d of the selector unit to drive the servos 160-166. However, as long as communication is maintained between the receiver 150 and the remote transmitter, the servos 160-166 will be driven by the control signals on lines 168a-d of the receiver 150. Selector unit 154 is a four-channel multiplexer of the conventional type, for example, IC Catalog No. 74C157.

As illustrated in FIG. 9, servo 160 corresponds to the aileron control, servo 162 corresponds to the elevator control, servo 164 corresponds to the throttle control, and servo 166 corresponds to the rudder control. To allow fine tuning of the servos 160-166 (servos 1-4), channel trimmers 176a-d are provided in the automatic pilot unit 152 for adjusting the servos 160-166, respectively. The servos 160-166 are of a conventional type and are well known in the art.

Figure 10:
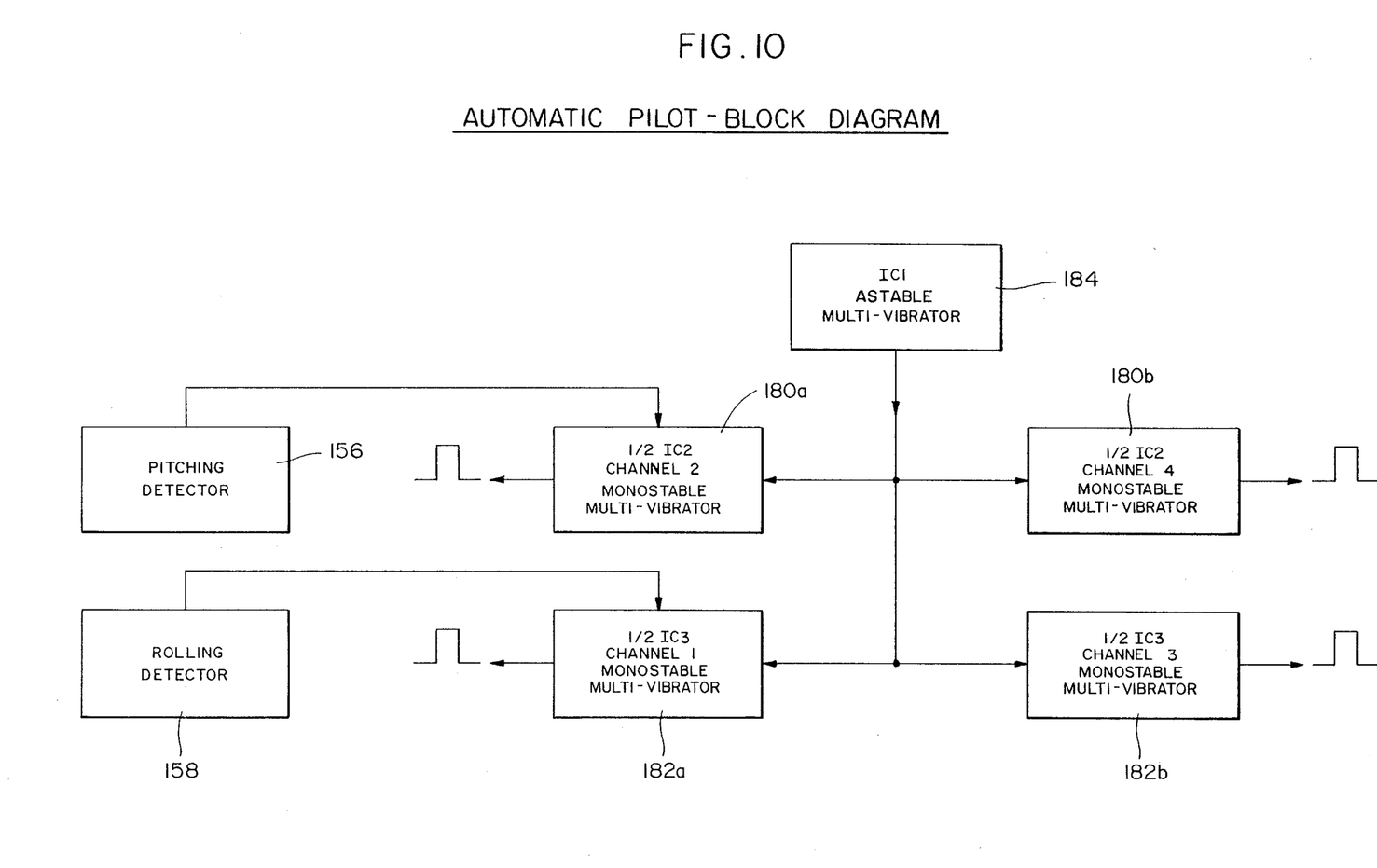
FIGS. 10 and 11 are schematic block diagrams of the auto-pilot control portion of the automatic pilot system illustrated in FIG. 9.
Figure 11:
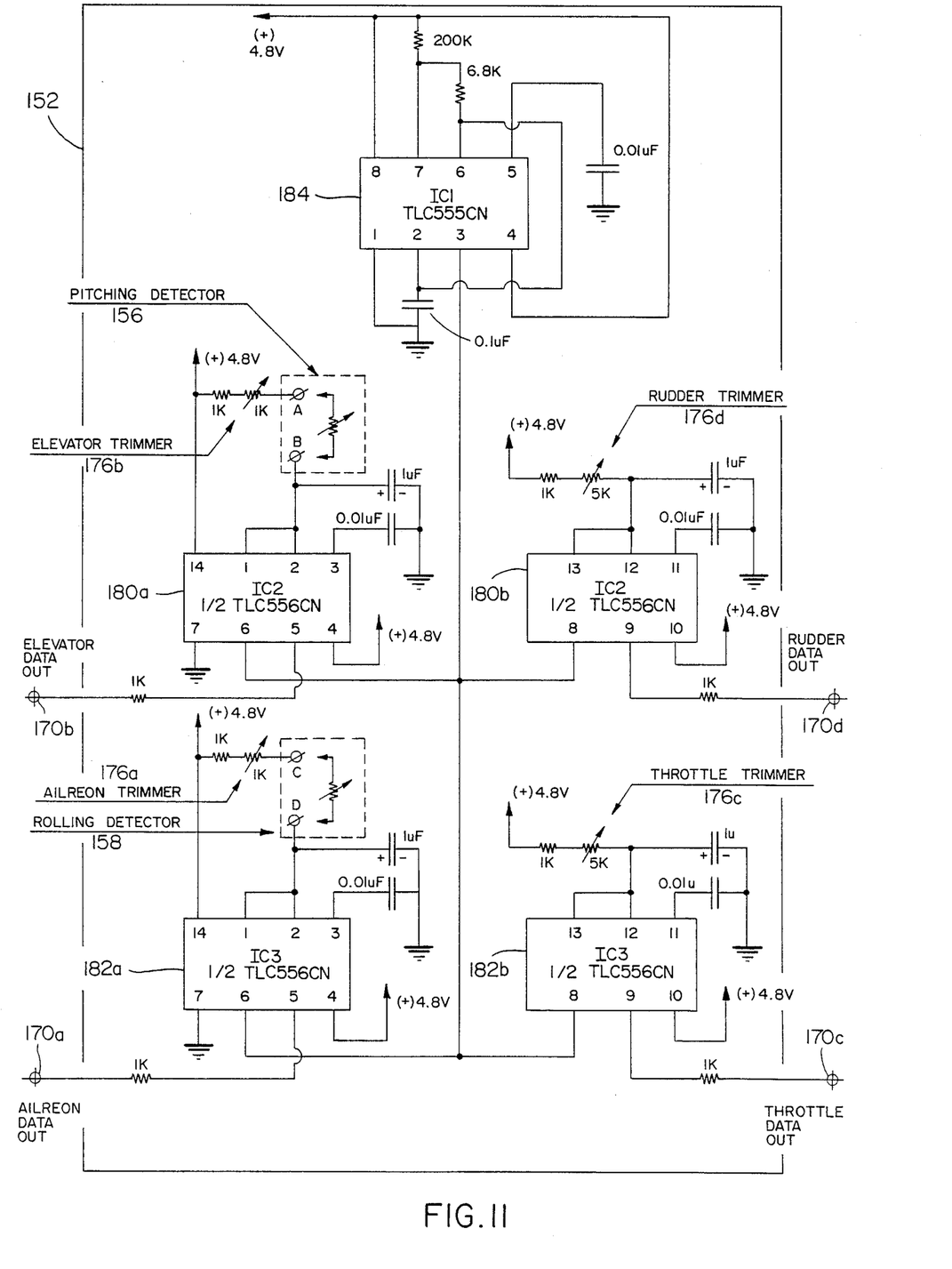

Referring now to FIGS. 10 and 11, the automatic pilot unit 152 will be described. The control signals generated for the data output lines 172a-d are generated by three integrated circuits (IC's). Specifically, IC 180 generates control signals for the elevator and rudder channels, and IC 182 generates the control signals for the aileron and throttle channels. The timing and synchronization of the control signals generated by the IC's 180 and 182 are controlled by IC 184. For simplicity, the IC's 180 and 182 are shown separately as 180a and 180b, and 182a and 182b, respectively. Each half of IC's 180 and 182 is dedicated to generating a particular control signal. Specifically, IC 180a receives, as input, output from the pitching detector 156, with any minor adjustments made by the elevator trimmer 176b. The elevator data output on line 170b is thus generated by IC 180a in accordance with the relative pitch of the airplane. Similarly, the IC 180b produces rudder data output on line 170d that determined by trimmer 176d. The rolling detector 158 is connected to IC 182a which, in response to adjustments by the aileron trimmer 176a, produces aileron data output on line 170a. Finally, in accordance with adjustments made on the throttle trimmer 176c, IC 182b produces throttle data output on line 170c.

Figure 12A:
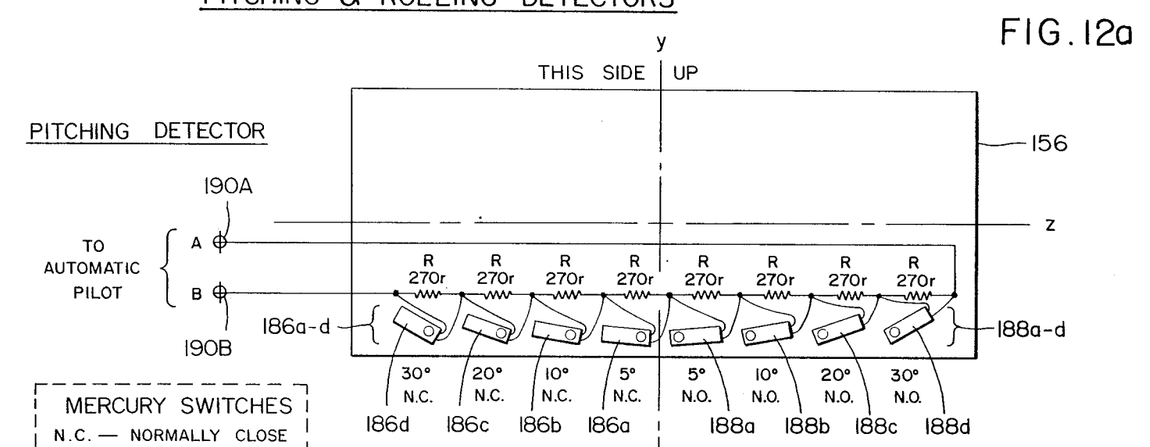
FIG. 12a is a block diagram illustrating the pitch detector of the automatic pilot system illustrated in FIG. 9.
Figure 12B:
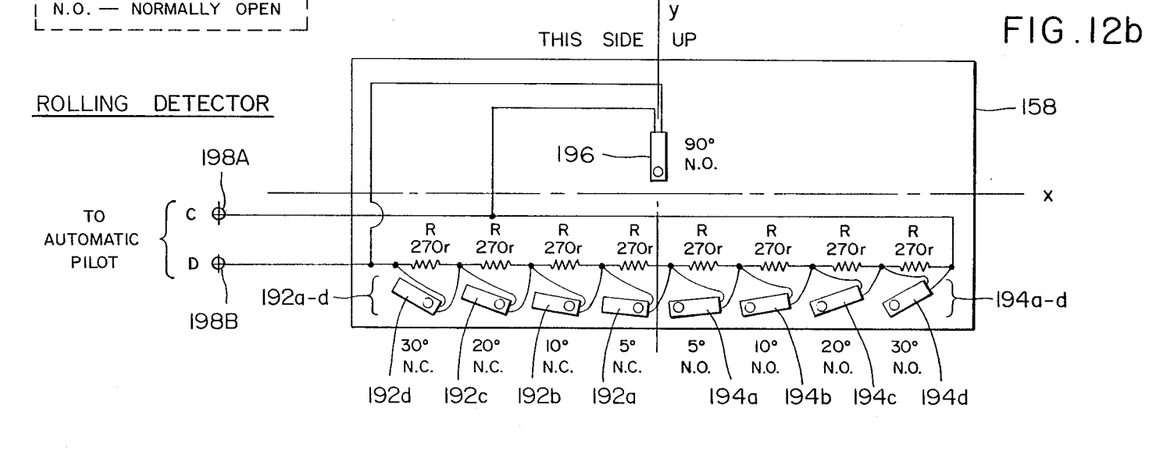
FIG. 12b is a block diagram illustrating the roll detector of the automatic pilot system illustrated in FIG. 9.

FIGS. 12a and 12b illustrates the pitch and roll detectors 156 and 158, respectively, in more detail. Referring first to FIG. 12a, the pitching detector 156 comprises a plurality of mercury switches securely arranged at various angles relative to the y–z coordinate plane. On the left side of the y-axis, mercury switches 186a-d are provided, which are normally closed, while on the right side of the y-axis, mercury switches 188a-d are provided, which are normally open. Each of the switches 186a-d and 188a-d is connected in parallel with a resistor R. Furthermore, the switches arc arranged at increasing angles relative to the y-z plane, moving out from the y-axis. By this arrangement, the relative pitch of the airplane is measured by the total resistance between terminals 190a and 190b. Specifically, should the airplane pitch forward, such that some of the normally open switches 188a–d close, the resistance between the terminals 190a and 190b will be reduced. On the other hand, should the airplane pitch so that some of the normally closed switches 186a–d should open, the resistance between the terminals 190a and 190b will increase. In sum, the mercury switches 186a–d and 188a–d selectively open or close for shunting or maintaining the effect of the associated resistor R for adjusting the resistance between the terminals 190a and 190b. An equilibrium resistance is established when there is no relative pitch. Otherwise, a change in the pitch is detected by an increase or decrease in resistance from this equilibrium point.

Similar to the pitching detector 156, the rolling detector 158 illustrated in FIG. 12b comprises a plurality of mercury switches arranged in x-y coordinate plane. Specifically, to the left of the y-axis, mercury switches 192a–d are provided, while to the right of the y-axis, mercury switches 192a–d are provided. In addition, a mercury switch 196 is provided along the y-axis. Each switch 192a–d is normally closed and connected in parallel with a resistor R, and switches 194a–d are normally open and connected in parallel with a resistor R. Furthermore, the mercury switches 192a–d and 194a–d are arranged in increasing angles relative to the x-y plane moving out from the y-axis. The mercury switch 196 is normally open so that the resistance between the terminals 198a and 198b is unaffected by the switch 196. Similar to the pitching detector, should the plane roll a certain angle in either direction relative to the x-y plane, the resistance between the terminals 198a and 198b will change. Specifically, looking at the x-y plane, should the airplane roll to the left, some of the normally closed switches 192a–d will open, thus increasing the resistance between the terminals 198a and 198b. However, should the airplane roll to the right, some of the normally open switches 194a–d will close, thus decreasing the resistance between the terminals 198a and 198b. Further, should the airplane roll more than 90° to the left or right, the resistance between the terminals 198a and 198b will be zero, as switch 196 closes, thus being a clear indication of such a dangerous situation. A level point is established by the switches so that an increasing resistance indicates a roll to one side, while a decreasing resistance indicates a roll to the other side.

While the relative position of the mercury switches in the pitching detector 156 and rolling detector 158 may vary depending upon a desired control resolution, it is envisioned that the switches 186a–d, 188a–d, 192a–d, and 194a–d are arranged at 5, 10, 20, and 30° relative to the z- and x-axes, as shown in FIGS. 12a and 12b. For example, should the airplane roll to the right 5° relative to the x-y plane, the switch 194a of the roll detector 158, which is normally open, will close. Should the plane continue to roll to the right, up to 20° relative to the x-y plane, then the switches 194b and 194c will also close. Therefore, it can be seen from this example that the relative pitch and roll of the plane can be accurately detected with the above mercury switch and resistor network.

It is envisioned that should communication between the transmitter and receiver be interrupted, the automatic pilot system will take over and control the flight path of the plane so that the plane travels in a gradual turn at a constant altitude to keep the plane within the range of the transmitter. To accomplish this, the autopilot unit 152 is programmable to control the servos 160–166 of the airplane. Specifically, the channel trimmers 176a–d, shown as potentiometers, can be adjusted to control the servos 160–166 for causing the airplane to go into a gradual sweeping turn at a constant altitude. Once communication is re-established between the transmitter and the receiver, the airplane can then be controlled by the remote transmitter. Alternatively, when the remote transmitter switch is off, it causes the selector unit 154 to select the control signals on data output lines 172a–d of the automatic pilot device 152, rather than the date output on the lines 168a–d of the receiver 150. In this way, a user may place the airplane in an automatic pilot mode for a period of time and regain control of the airplane when desired.

Having described the invention many modifications thereto will become apparent to those skilled in the art to which it pertains without deviating from the spirit of the invention, as defined by the scope of the appended claims.

We claim:

1. A remote control noise-generating device comprising:
   a radio-controlled airplane,
   a cannon firing mechanism mounted on said airplane, said cannon firing mechanism including an elongated body, tube means pivotally mounted on one end of said body for holding explosive cartridges, and firing means for detonating cartridges held in said tube, and
   a transmitter for controlling said airplane and for energizing said firing means,
   said body being mounted on a fuselage of said airplane at an angle to said fuselage.

2. A remote control noise-generating device comprising:
   a radio-controlled airplane,
   a cannon firing mechanism mounted on said airplane, said cannon firing mechanism including an elongated body, tube means pivotally mounted on one end of said body for holding explosive cartridges, and firing means for detonating cartridges held in said tube, and
   a transmitter for controlling said airplane and for energizing said firing means,
   said firing means including spring biased firing pins and a rotatable cam for restraining and releasing said firing pins.

3. A remote control noise-generating device comprising:
   a radio-controlled airplane,
   a cannon firing mechanism mounted on said airplane, said cannon firing mechanism including an elongated body, tube means pivotally mounted on one end of said body for holding explosive cartridges, and firing means for detonating cartridges held in said tube, and
   a transmitter for controlling said airplane and for energizing said firing means,
   said body being mounted on a wing of said airplane.

4. A cannon firing mechanism for mounting on an RC airplane, said cannon firing mechanism comprising:
   an elongated body,
   tube means pivotally mounted on one end of said body for holding of exploding cartridges,
   a plurality of firing pins extending along a longitudinal axis of said body,
   a stop fixed to each of said plurality of firing pins, spring means located between said stop and an opposite end of said body for biasing said plurality of firing pins towards said one end of said body, cam means rotatably mounted on said body and rotatable in a plane extending transverse to said longitudinal axis of said body, servo means for receipt of remote signals and for actuating rotation of said cam means upon receipt of said signals, said cam means being rotatable to a plurality of positions by said servo means to restrain projection of said firing pins against the force of said spring means in a compressed state and to release said firing pins to allow said firing pins to be propelled by said spring means into contact with cartridges held by said tube means.

5. The cannon firing mechanism of claim 4, wherein said cam means includes a cam having a plurality of sectors equal in number to the of said plurality of firing pins.

6. The cannon firing mechanism of claim 5, wherein said sectors are of different sizes.

7. The cannon firing mechanism of claim 4, further comprising mounting means for mounting said body on an RC airplane at an angle to a fuselage of said airplane so as to avoid contact with the propeller of said airplane by a cartridge propelled from said tube means.

8. The cannon firing mechanism of claim 4, further comprising a transmitter for generating signals received by said servo means to cause rotation of said cam means.

9. A rocket launcher for mounting on an RC airplane, said rocket launcher comprising:
- a bracket for securing the rocket launcher on a wing of an RC airplane,
- a rocket tube mounted on said bracket for holding a rocket,
- ignition means for igniting the rocket in said rocket tube,
- a power source mounted on said bracket,
- a microswitch electrically connected to said ignition means and said power source, and
- servo means for receipt of remote signals and for closing said microswitch in response to receipt of said remote signals to ignite the rocket and cause the rocket to be launched.

10. A remote control noise-generating device comprising;
- a radio-controlled model airplane having an engine for powered flight,
- a cannon firing mechanism mounted on said airplane, said cannon firing mechanism including an elongated body, tube means pivotally mounted on one end of said body for holding explosive cartridges, and firing means for detonating cartridges held in said tube means, and
- a transmitter for controlling powered flight of said airplane and for energizing said firing means.

* * * * *